US006671324B2

United States Patent
Vetro et al.

(10) Patent No.: US 6,671,324 B2
(45) Date of Patent: Dec. 30, 2003

(54) ESTIMATING TOTAL AVERAGE DISTORTION IN A VIDEO WITH VARIABLE FRAMESKIP

(75) Inventors: Anthony Vetro, Staten Island, NY (US); Huifang Sun, Cranbury, NJ (US); Yao Wang, Matawan, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 463 days.

(21) Appl. No.: 09/835,650

(22) Filed: Apr. 16, 2001

(65) Prior Publication Data

US 2002/0181598 A1 Dec. 5, 2002

(51) Int. Cl.$^7$ .......................... H04N 7/12; H04N 11/02; H04N 11/04
(52) U.S. Cl. .................. 375/240.27; 375/240.08
(58) Field of Search .................. 375/240.12, 240.13, 375/240.03, 240.15, 240.27, 240.08, 240.1; 382/232, 236, 238, 239, 242, 243; 348/425.2; H04N 7/12, 11/02, 11/04

(56) References Cited

U.S. PATENT DOCUMENTS

| 5,969,764 | A | | 10/1999 | Sun et al. | |
|---|---|---|---|---|---|
| 6,023,296 | A | * | 2/2000 | Lee et al. | 375/240.05 |
| 6,084,908 | A | * | 7/2000 | Chiang et al. | 375/240.03 |
| 6,141,446 | A | * | 10/2000 | Boliek et al. | 382/233 |
| 6,160,846 | A | * | 12/2000 | Chiang et al. | 375/240.05 |
| 6,167,162 | A | | 12/2000 | Jacquin et al. | |
| 6,483,928 | B1 | * | 11/2002 | Bagni et al. | 382/107 |
| 6,528,793 | B1 | * | 3/2003 | Chen et al. | 250/363.03 |
| 6,542,545 | B1 | * | 4/2003 | Vetro et al. | 375/240.08 |

FOREIGN PATENT DOCUMENTS

EP   WO 02/085038 A1  * 10/2002   .......... H04N/17/00

* cited by examiner

*Primary Examiner*—Nhon Diep
(74) *Attorney, Agent, or Firm*—Dirk Brinkman

(57) ABSTRACT

A method determines distortion in a video by measuring a spatial distortion in coded frames, and by measuring a temporal distortion and spatial distortion in uncoded frames. The spatial distortion of the coded frames is combined with the temporal distortion and the spatial distortion of the uncoded frames to determine a total average distortion in the video.

10 Claims, 4 Drawing Sheets

US 6,671,324 B2

ESTIMATING TOTAL AVERAGE DISTORTION IN A VIDEO WITH VARIABLE FRAMESKIP

FIELD OF THE INVENTION

This invention relates generally to video encoding, and more particularly to determining distortion characteristics of videos.

BACKGROUND OF THE INVENTION

A number of video coding standards support variable frameskip, e.g., H.263 and MPEG-4. With variable frameskip, any number of frames of the input video can be skipped during the coding. That is, the frames remain uncoded. With these video coding standards, the encoder may choose to skip frames of a video to either satisfy buffer constraints, or to optimize the video coding process. However, most encoders only skip frames to satisfy buffer constraints. In this case, the coder is forced to skip frames when limitations on the bandwidth cause the buffer to fill up. Consequently, it is not possible to add any additional frames to the buffer, and the frames remain uncoded until the buffer is drained. This type of frame skipping degrades the quality of the video because the content of the video is not considered.

It is a problem to provide an optimal coding method for a video. Specifically, a particular video could be coded with more frames having a lower spatial quality, or fewer frames having a higher spatial quality. This trade-off between spatial and temporal quality is not a simple binary decision, but rather a decision over a finite set of coding parameters. Obviously, the best set of coding parameters will yield the optimal rate-distortion (R-D) curve. The two parameters of interest are the number of frames per second (fps) and a quantization parameter (QP). In the known prior art, the total distortion is measured only for coded frames, and is expressed as the mean-squared error (MSE) between pixels in the original and compressed video.

Prior art optimized coding methods do not consider the temporal aspect of rate-distortion, see H. Sun, W. Kwok, M. Chien, and C. H. John Ju, "MPEG coding performance improvement by jointly optimizing coding mode decision and rate control," *IEEE Trans. Circuits Syst. Video Technol.*, June 1997, T. Weigand, M. Lightstone, D. Mukherjee, T. G. Campbell, S. K. Mitra, "R-D optimized mode selection for very low bit-this rate video coding and the emerging H.263 standard," *IEEE Trans. Circuits Syst. Video Technol.*, and April 1996, J. Lee and B. W. Dickenson, "Rate-distortion optimized frame type selection for MPEG encoding," *IEEE Trans. Circuits Syst. Video Technol.*, June 1997. Generally, it is assumed that the frame-rate is fixed.

These methods consider optimizations on the quantization parameter, H. Sun, W. Kwok, M. Chien, and C. H. John Ju, "MPEG coding performance improvement by jointly optimizing coding mode decision and rate control," *IEEE Trans. Circuits Syst. Video Technol.*, June 1997, mode decisions for motion and block coding, T. Weigand, M. Lightstone, D. Mukherjee, T. G. Campbell, S. K. Mitra, "R-D optimized mode selection for very low bit-this rate video coding and the emerging H.263 standard," *IEEE Trans. Circuits Syst. Video Technol.*, April 1996, and frame-type selection, J. Lee and B. W. Dickenson, "Rate-distortion optimized frame type selection for MPEG encoding," *IEEE Trans. Circuits Syst. Video Technol.*, June 1997. Such methods can achieve an optimum coding when the frame-rate is fixed, and the bit rate can be for the given frame-rate. However, these methods are less than optimal for varying frame-rates.

It should be noted that the trade-off between spatial and temporal quality, while coding, has been described by F. C. Martins, W. Ding, and E. Feig, in "Joint control of spatial quantization and temporal sampling for very low bit rate video," *Proc. ICASSP,* May 1996. However, in their method, the trade-off was achieved with a user selectable parameter.

Therefore, it is desired to provide a better method for determining distortion in a video.

SUMMARY OF THE INVENTION

The present invention provides a method for determining the distortion in a video subject to variable frameskip processing. If the input video is uncompressed and to be coded, then the distortion is an estimate of the distortion in an output compressed video, whereas if the input video is compressed, then the distortion is an actual measure of distortion in the compressed video.

The distortion for coded frames (candidate or actual) is given by a rate-distortion model, and the distortion for uncoded frames (candidate or actual) can be based on an optical flow in the video. The method according to the invention produces accurate distortion values over a range of videos with varying scene complexities. In the case the input video is uncoded, the method can be used for optimizing the trade-off between spatial and temporal quality in a video coder. For a compressed video, the method can also be used to compare the relative quality without having access to the original video.

More particularly, a method determining distortion in a video by measuring a spatial distortion in coded frames, and by measuring a temporal distortion and spatial distortion in uncoded frames. The spatial distortion of the coded frames is combined with the temporal distortion and the spatial distortion of the uncoded frames to determine a total average distortion in the video.

DETAILED DESCRIPTION OF THE PREFERRED EMBODIMENT

Introduction

Determining Total Average Distortion

Figure 1:
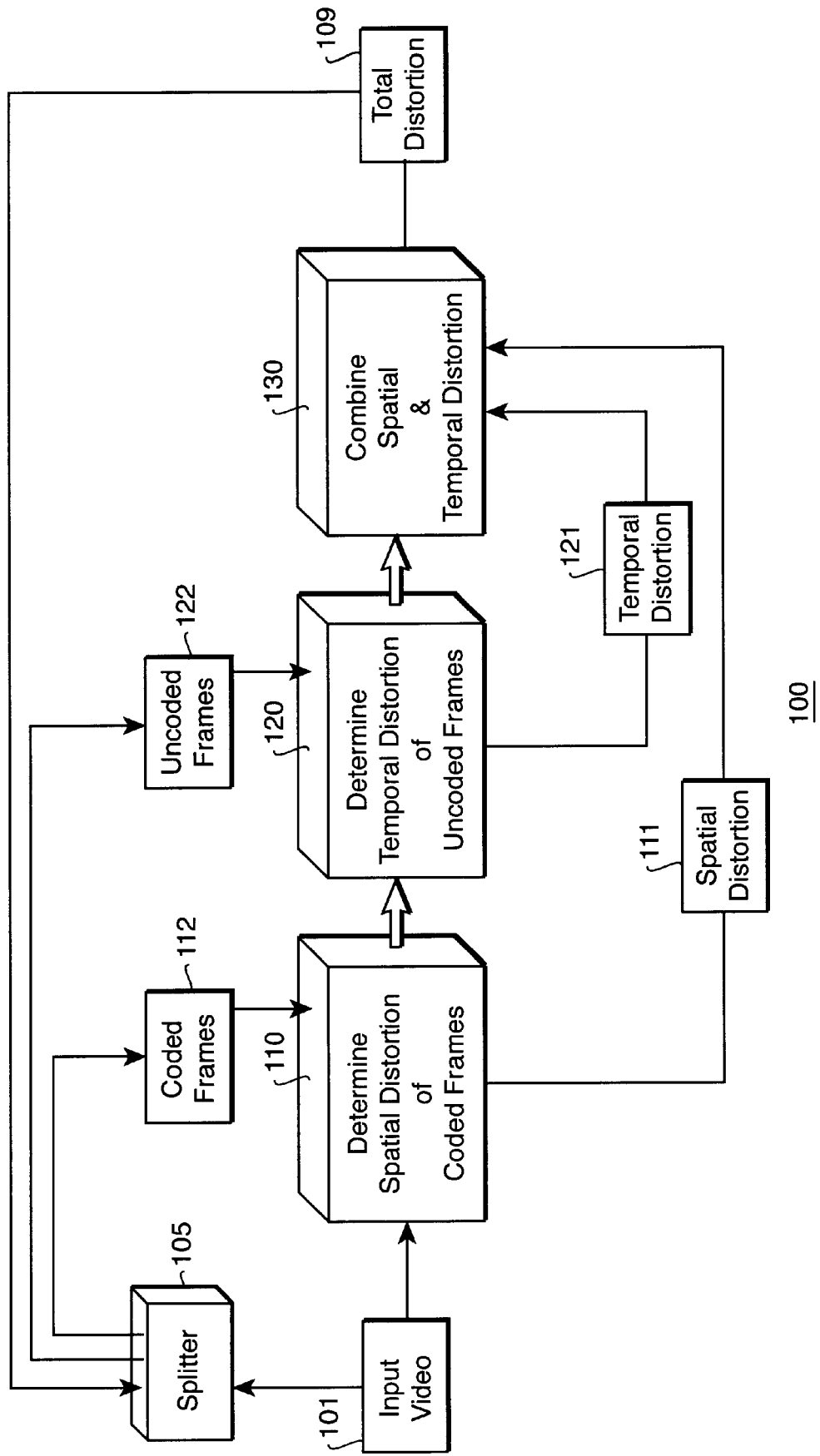
FIG. 1 is a flow diagram of a method for determining distortion in a video according to the invention.

As shown in FIG. 1, our invention provides a method 100 for determining the total average distortion 109 in a video 101 subject to variable frameskip processing. If the input video 101 is uncompressed and to be coded, then the frames are candidate coded 112 or uncoded 122 frames, and the total distortion 109 is an estimate of the distortion in an output compressed video, whereas if the input video 101 is compressed, then the frames are actual coded 112 or uncoded 122 frames, and the total distortion 109 is an actual measure of distortion in the compressed video.

In one embodiment where the video is uncompressed, a splitter 105 determines which frames are coded (112), and which frames are skipped (122). The decision is based on the measured average total distortion 109.

We denote the spatial distortion for coded frames 112 by $\overline{D}_c(Q)$ 111, and the temporal and spatial distortion for uncoded frames 122 by $\overline{D}_s(Q, f_s)$ 121, where Q represents a quantization parameter (QP) used for coding, and $f_s$ a frameskip factor that is related to the number of uncoded frames.

The spatial distortion 111 is dependent on the quantizer, a spatial measure, while the temporal distortion 121 depends on both the quantizer and the number of uncoded frames.

Although the distortion for uncoded frames does not directly influence the distortion of coded frames, it does influence it indirectly in two ways. First, the number of uncoded frames influences a residual statistical component, and second, it influences the quantizer that is selected.

It is important to note that the distortion 111 for the uncoded frames 122 has a direct dependency on the quantization step size in the coded frames 112. The reason is that the uncoded frames 122 are interpolated from the coded frames 112, thereby carrying the same spatial quality, in addition to the temporal distortion.

Given the above, we determine the average distortion over a specific time interval $(t_i + f_{i+f_s}]$ by, $$\overline{D}_{(t_i, t_{i+f_s}]}(Q_{i+f_s}, f_s) = \frac{1}{f_s}\left[D_c(Q_{i+f_s}) + \sum_{k=i+1}^{i+f_s-1} D_s(Q_i, k)\right]. \quad (1)$$

In equation 1, the distortion over the specified time interval is due to the spatial distortion of one coded frame at $t = t_{i+fs}$, plus the temporal distortion of $f_s-1$ uncoded frames. The temporal distortion is dependent on the quantizer for the previously coded frame at $t = t_i$.

Spatial Distortion

It is well known that the variance of the quantization error is given by, $$\sigma_q^2 = a \cdot 2^{-2R} \sigma_z^2, \quad (2)$$

where $\sigma_z^2$ is the input signal variance, R is the average rate per sample, and a is a constant that is dependent on the probability distribution function (PDF) of the input signal and quantizer characteristics, see Jayant et al. *"Digital Coding of Waveforms,"* Prentice Hall, 1984. In the absence of entropy coding, the value of a typically varies between 1.0 and 10. With entropy coding, the value of a can be less than 1.0. We use equation 2 to determine 110 the spatial distortion 111 as, $$D_c(Q_i) = a \cdot 2^{-2R(t_i)} \cdot \sigma_z^2. \quad (3)$$

Equation 3 is valid for a wide array of quantizers and signal characteristics. Such aspects are accounted for in the value of a. However, as stated above, the number uncoded frames can impact the statistics of the residual. In general, we have determined that the average bits per frame increases for larger values of $f_s$. However, the variance remains substantially the same. This indicates that the variance is incapable of reflecting small differences in the residual that impact the actual relation between rate and distortion. This is caused by the presence of high-frequency coefficients. Actually, it is not only the presence of the high-frequency coefficients, but also their position. If certain run-lengths are not present in a variable length coding table, e.g. Huffman coding, less efficient escape coding techniques must be used. This probably means that $f_s$ affects the PDF of the residual, i.e., the value of a, while holding $\sigma_z^2$ substantially fixed.

We ignore any changes in the residual due to the uncoded frames, and use the model given by equation 3 to determine the spatial distortion 111. A fixed a and $\sigma_{z_i}^2$ determined from the last coded frame is used.

Temporal Distortion

To determine 120 the temporal distortion 121 of the uncoded frames 122, we assume, without loss of generality, that a temporal interpolator of a code simply repeats the last coded frame. Other interpolators that average past and future coded frames, or make predictions based on motion, can also be considered.

As stated above, the distortion due to uncoded frames has two parts: one due to the coding of the reference frame (last coded frame), and another due to the interpolation error. We express the distortion at $t_k$ as, $$e_k = \psi_k - \hat{\psi}_k = \psi_k - \tilde{\psi}_i \quad (4)$$

$$= \underbrace{\psi_k - \psi_i}_{\Delta z_{i,k}} + \underbrace{\psi_i - \tilde{\psi}_i}_{\Delta c_i},$$

wherein $\hat{\psi}_k$ denotes the estimated frame at $t = t_k$, $\psi_i$ denote the last coded frame at $t_i < t_k$, $\tilde{\psi}_i$, and $\Delta Z_{i,k}$ and $\Delta c_i$ represent the frame interpolation error and coding error, respectively. If these quantities are independent, the mean square error (MSE) is $$E\{e_k^2\} = E\{\Delta^2 c_i\} + E\{\Delta^2 z_{i,k}\}, \quad (5)$$

which can be equivalently expressed as, $$D_s(Q_i, k) = D_c(Q_i) + E\{\Delta^2 z_{i,k}\}, \quad (6)$$

that is, the combination 130 of the spatial and temporal distortions. Equation 6 implies that the components contributing to the temporal distortion 121 are additive. However, other combinations may also be considered.

To derive the expected MSE due to frame interpolation, we first assume that the frame at time $t_k$ is related to the frame at time $t_i$ with motion vectors $(\Delta x(x, y), \Delta y(x, y))$, $$\psi_k(x, y) = \psi_i(x + \Delta x(x, y), y + \Delta y(x, y)). \quad (7)$$

In the equation 7, it is assumed that every pixel (x, y) has an associated motion vector. In actuality, we approximate the motion at every pixel by having one motion vector per macroblock. Then, $$\Delta z_{i,k} = \psi_i(x + \Delta x_{i,k}, y + \Delta y_{i,k}) - \psi_i(x, y), = \frac{\delta \psi_i}{\delta x} \Delta x_{i,k} + \frac{\delta \psi_i}{\delta y} \Delta y_{i,k}, \quad (8)$$

where $$\left(\frac{\delta \psi_i}{\delta x}, \frac{\delta \psi_i}{\delta y}\right)$$

represent the spatial gradients in the x and y directions. Note, this equation is expanded by using a first-order Taylor expansion and is valid for small $(\Delta x, \Delta y)$. This is equivalent to an optical flow equation, where the same condition on motion is also true.

It should be noted that equation 8 is less accurate when the amount of motion in a sequence of frames is large. However, for coding applications that estimate the distortion to decide if a lower MSE can be achieved with more uncoded frames, the accuracy of the motion estimation is not so critical because an optimized encoder would not skip frames for such sequences anyway. The MSE incurred by skipping frames in a sequence with large motion would be very large.

Treating the spatial gradients and motion vectors as random variables and assuming the motion vectors and spatial gradients are independent and zero-mean, we have, $$E\{\Delta^2 z_{i,k}\} = \sigma_{x_i} + \sigma_{\Delta x_{i,k}} + \sigma_{y_i}^2 \sigma_{y_i}^2 \sigma_{\Delta y_{i,k}}^2 \tag{9}$$

where $(\sigma_{x_i}^2, \sigma_{y_i}^2)$ represent the variances for the x and y spatial gradients in frame i, and $(\sigma_{\Delta x_{i,k}}^2, \sigma_{\Delta y_{i,k}}^2)$ represent the variances for the motion vectors in the x and y direction. Equation 9 shows that it is sufficient to determine the temporal distortion from the second-order statistics of the motion and spatial gradient.

Practical Considerations

In practical coding applications, where an encoder would estimate the total distortion, the main problem is to determine 120 the temporal distortion 121 based on past and current data. For instance, equation 9 assumes that the motion between i, the current frame, and k, a future frame is known. However, this would imply that motion estimation is performed for each candidate frame to be coded or not, where these candidate frames have a time index k. This is impractical. Therefore, we assume the motion between frames is linear, and approximate the variance of motion vectors by, $$\sigma_{\Delta x_{i,k}}^2 \approx \sigma_{\Delta x_{i-f_l,i}} \cdot \left(\frac{k-i}{f_l}\right)^2, \tag{10}$$

where $f_l$ denotes the number of uncoded frames between the last coded frame and its reference frame.

Similarly, estimates of the distortion for the next candidate frame to be coded, i.e., the measurement specified by equation 3, requires knowledge of a and $\sigma_{z_i}^2$, which depends on $f_s$. As mentioned above, motion estimation for every candidate frame is not performed, therefore the actual residuals are also unavailable. To overcome this practical difficulty, the residual for future frames can be predicted from the residual of the current frame at, i.e., $t=t_i$.

However, as described above, the relationship between the a, $\sigma_{z_i}^2$ and the uncoded frames is not as obvious as the relation between motion and in uncoded frames. Also, we have observed that changes in the variance for different numbers of uncoded frames are very small. Therefore, we use the residual variance of the current frame at $t=t_i$ for the candidate frames as well. In this way, changes in $D_c$ are only affected by the "bit budget" for candidate frameskip factors.

If the input video 101 is in compressed form, then the data are known, and the estimate become an actual measure of total average distortion. In this case, the above considerations do not apply.

Results

To confirm the accuracy of our method, we perform two sets of experiments. A first experiment tests the accuracy of the estimated distortion for coded frames and a second experiment to test the accuracy of the estimated distortion for uncoded frames.

Figure 2:
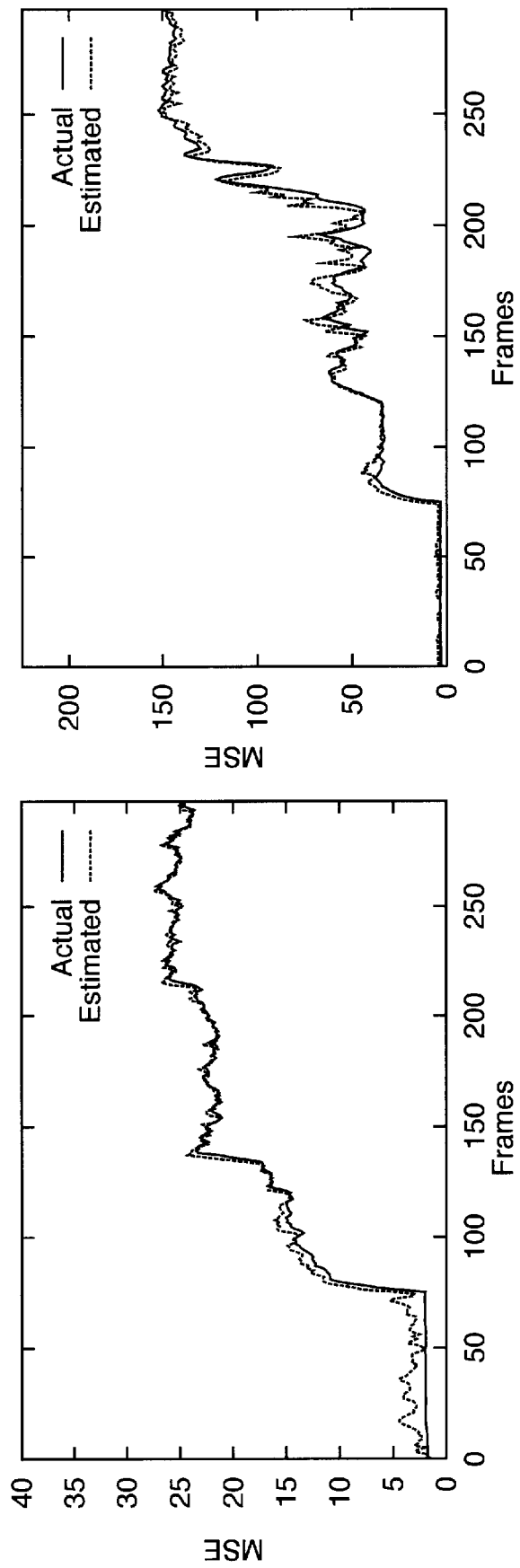
FIG. 2 is a plot comparing the actual and estimated distortion for coded frames.

The testing conditions for the first experiment are as follows. We consider two well known test sequences in FIG. 2: Akiyo (left) and Foreman (right. Each sequence is coded at its full frame-rate of 30 fps. Three fixed quantizers are used to code each sequence, Q=2 for the first 100 frames, Q=15 for the next 100 frames and Q=30 for the last 100 frames. FIG. 2 shows plots for Akiyo and Foreman in which the estimated distortion is determined according to equation 3, with a=1.

From these plots, we first note that for the most part the estimated distortion tracks the actual distortion. Second, in both sequences, the estimation of the coded distortion at fine quantizer values tends to be over-estimated. The reason for this is not clear, but we note that it is possible to use a calibrated value of a to correct this estimation error, or to simply use a fixed MSE when the quantizer is so fine.

Figure 3:
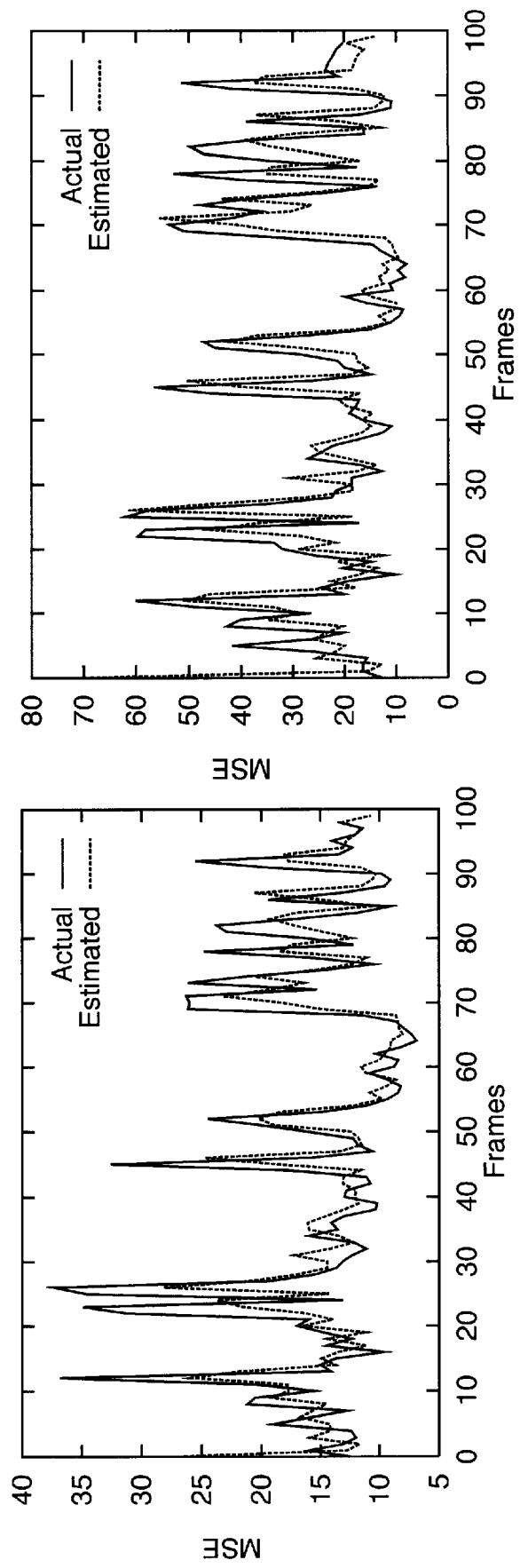
FIG. 3 is a plot comparing the actual and estimated distortion for the uncoded frames of the Akiyo sequence coded at a fixed frame rate of 10 fps.

For the second experiment, we consider the Akiyo sequence coded at a fixed frame-rate of 10 fps and the Foreman sequence coded at a fixed rate of 15 fps. A comparison of the actual and estimated distortion for the uncoded frames in Akiyo is shown in FIG. 3. The left graph shows the first uncoded frames, while the right plot shows the second uncoded frames. The graph indicates that the estimated distortion in the uncoded frames for Akiyo is quite accurate.

Figure 4:
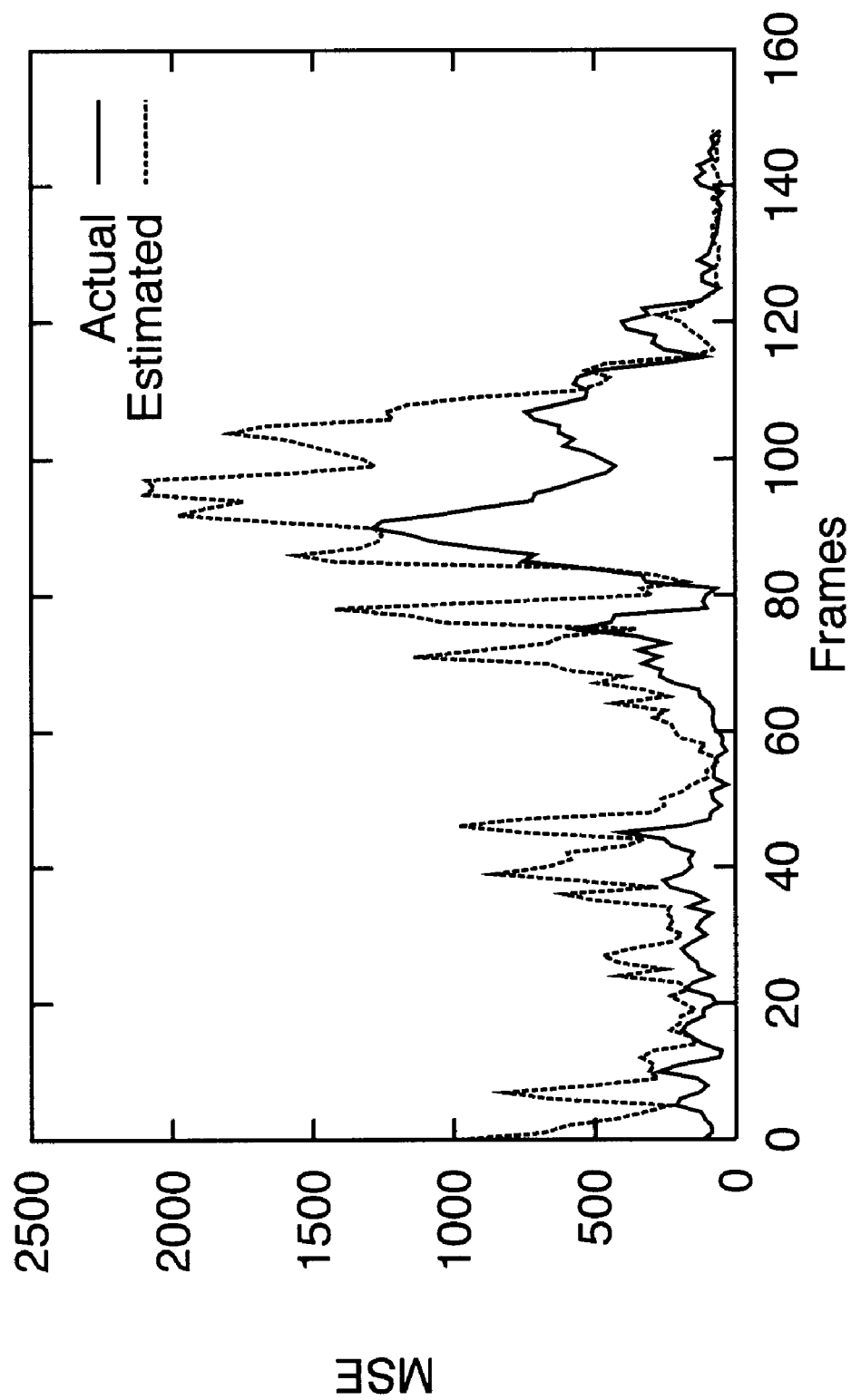
FIG. 4 is a plot comparing the actual and estimated distortion for the uncoded frames of the Foreman sequence coded at a fixed frame rate of 15 fps.

FIG. 4 compares the actual and estimated distortion for the uncoded frames in the Foreman sequence. Although the estimated distortion is not as accurate as Akiyo, we can see that it is able to follow variations in the actual distortion quite well.

However, because the motion in the sequence is large, the distortion due to frame skipping is a significant factor in the overall distortion. It is safe to say that an optimized coder will never skip frames for such a sequence. Rather, it will resort to using a quantizer until buffer constraints force the encoded sequence to a lower frame-rate. As a result, the accuracy for the distortion of uncoded frames is much more critical for sequences with low to moderate motion.

This invention is described using specific terms and examples. It is to be understood that various other adaptations and modifications may be made within the spirit and scope of the invention. Therefore, it is the object of the appended claims to cover all such variations and modifications as come within the true spirit and scope of the invention.

We claim:

1. A method for determining distortion in a video, comprising:
   measuring a spatial distortion in coded frames;
   measuring a temporal distortion and spatial distortion in uncoded frames; and
   combining the spatial distortion of the coded frames with the temporal distortion and the spatial distortion of the uncoded frames to determine a total average distortion in the video.

2. The method of claim 1 wherein the video is uncompressed, and the coded and uncoded frames are candidate frames to be coded, and the total average distortion is an estimate.

3. The method of claim 1 wherein the video is compressed, and the coded and uncoded frames are actual frames, and the total average distortion is a measure of the total distortion.

4. The method of claim 1 wherein the temporal distortion is determined from an optical flow in the uncoded frames.

5. The method of claim 2 wherein the candidate frames are coded to minimize the total average distortion.

6. The method of claim 5 further comprising:
   receiving the total average distortion in a splitter in order to determine which candidate frames are to be coded, and which candidate fame are to be skipped.

7. The method of claim 1 wherein the temporal distortion is a sum of an interpolation error and a quantization error.

8. The method of claim 1 wherein the interpolation distortion is $$E\{\Delta^2 z_{i,k}\} = \sigma_{x_i}^2 + \sigma_{y_i}^2 \sigma_{\Delta y_{i,l}}^2,$$

where $(\sigma_{x_{i,k}}^2, \delta_{\Delta y_{i,k}}^2)$ represent a variances for x and y spatial gradients in a particular frame i, and $(\sigma_{\Delta x_{i,k}}^2, \sigma_{\Delta y_{i,k}}^2)$ represent a variances for motion vectors in x and y directions.

9. The method of claim 8 wherein an approximation of the variance of the motion vectors is $$\sigma_{\Delta x_{i,k}}^2 \approx \sigma_{\Delta x_{i-f_l,i}} \cdot \left(\frac{k-i}{f_l}\right)^2,$$

where $f_l$ denotes the number of uncoded frames between a last coded frame i, and an associated reference frame, k is a candidate frame such that k>i.

10. A system for determining distortion in a video, comprising:

means for measuring a spatial distortion in coded frames;

means for measuring a temporal distortion and spatial distortion in uncoded frames; and means for combining the spatial distortion of the coded frames with the temporal distortion and the spatial distortion of the uncoded frames to determine a total average distortion in the video.

\* \* \* \* \*